United States Patent
Chukka et al.

(10) Patent No.: US 10,517,136 B1
(45) Date of Patent: Dec. 24, 2019

(54) WIRELESS COMMUNICATION SYSTEM TO DETECT A SLEEPY-CELL CONDITION

(71) Applicant: Sprint Communications Company L.P., Overland Park, KS (US)

(72) Inventors: Chaitanya Chukka, Schaumburg, IL (US); Anoop Kumar Goyal, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 113 days.

(21) Appl. No.: 15/337,300

(22) Filed: Oct. 28, 2016

(51) Int. Cl.
| | |
|---|---|
| *H04W 76/27* | (2018.01) |
| *H04W 16/28* | (2009.01) |
| *H04L 12/26* | (2006.01) |
| *H04B 7/06* | (2006.01) |

(52) U.S. Cl.
CPC ............ *H04W 76/27* (2018.02); *H04L 43/16* (2013.01); *H04W 16/28* (2013.01); *H04B 7/0617* (2013.01); *H04B 7/0656* (2013.01)

(58) Field of Classification Search
None
See application file for complete search history.

(56) References Cited

U.S. PATENT DOCUMENTS

| | | | |
|---|---|---|---|
| 8,768,339 B2 | 7/2014 | Yang et al. | |
| 9,106,284 B1 * | 8/2015 | Scott | H04B 7/0689 |
| 2012/0106423 A1 | 5/2012 | Nylander et al. | |
| 2012/0157089 A1 * | 6/2012 | Yang | H04L 41/0645 |
| | | | 455/424 |
| 2014/0003312 A1 | 1/2014 | Sergeyev et al. | |
| 2015/0181446 A1 | 6/2015 | Sandberg et al. | |
| 2016/0360571 A1 * | 12/2016 | Yokosawa | H04W 88/085 |
| 2017/0059717 A1 * | 3/2017 | Polehn | G01S 19/48 |

FOREIGN PATENT DOCUMENTS

WO 2013191600 12/2013

* cited by examiner

*Primary Examiner* — Peter Chen

(57) ABSTRACT

A wireless communication system to detect a sleepy-cell condition. The wireless communication system comprises a remote radio head that receives network data comprising user data and beamforming instructions from a baseband unit. The remote radio head transfers the user data to wireless communication devices over wireless column beams responsive to the beamforming instructions. The remote radio head further detects a loss of the beamforming instructions for a time threshold and responsively transfers a sleepy-cell alarm indicating the baseband unit.

14 Claims, 6 Drawing Sheets

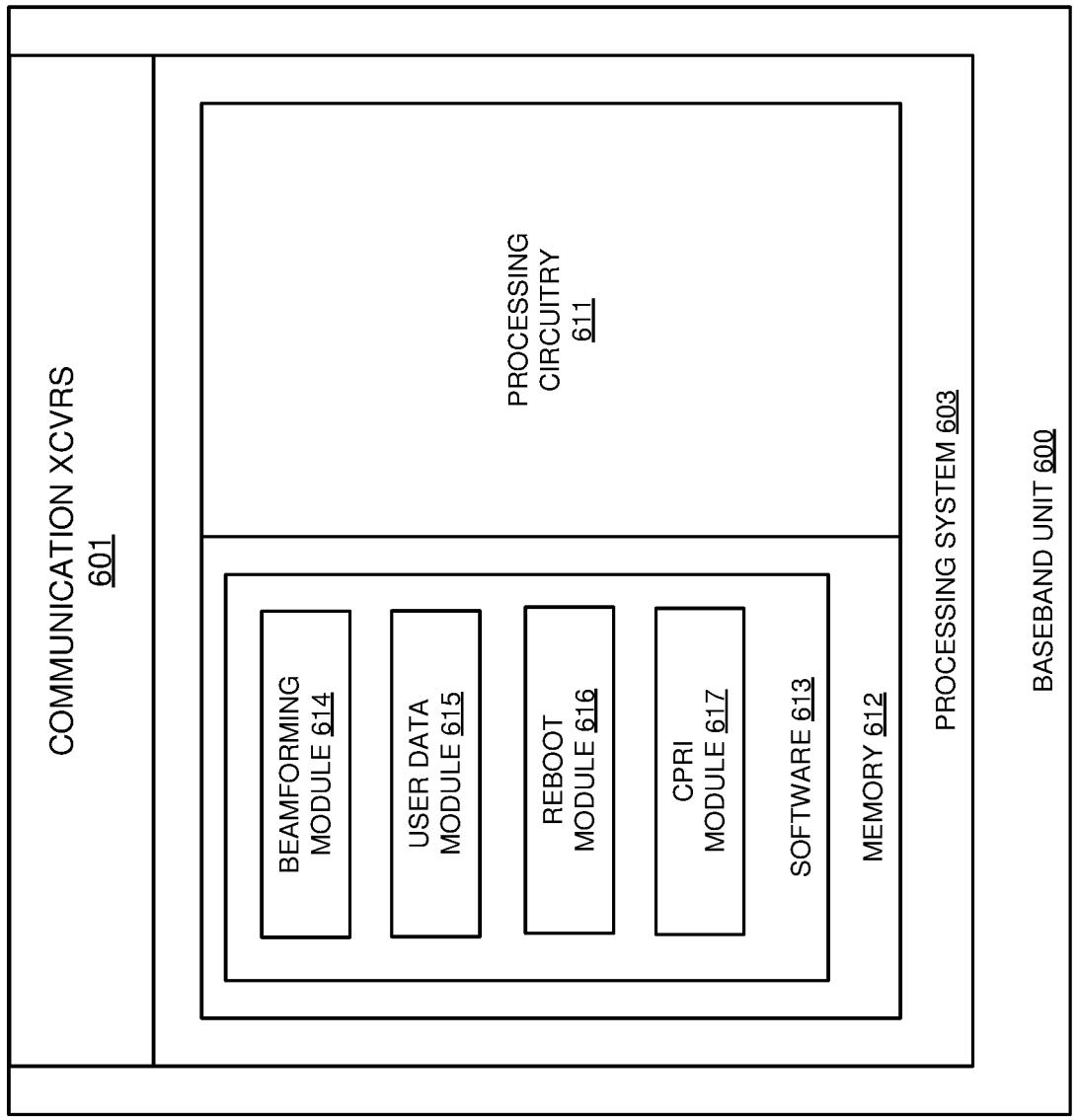

WIRELESS COMMUNICATION SYSTEM TO DETECT A SLEEPY-CELL CONDITION

TECHNICAL BACKGROUND

Wireless communication devices are used for services such as voice and video calling, Internet access and web browsing, media streaming, messaging, email, and the like. To receive these services, wireless communication devices connect to a wireless communication network. Wireless communication networks include wireless access points spread over a geographic area through which the wireless communication devices can register and receive wireless access to the wireless communication services.

The wireless access points use antenna systems to exchange electromagnetic signals over the air to support the wireless services to the wireless communication devices. Beamforming technologies use advanced amplification and phasing to control the direction and shape of the energy field propagating toward the target wireless communication device. The energy field near the wireless communication device is projected and enhanced. Effective beamforming typically requires feedback from the wireless communication device, such as its location and received signal quality. The feedback is used to direct the proper amount of energy in the proper direction. Wireless access points may enter a reserved state, which disables the traffic path from the wireless access point to the connected wireless communication device(s). When a wireless access point enters the reserved state, the wireless access point must be manually reset on-site.

Overview

Examples disclosed herein provide a system, method, hardware, and software to detect a sleepy-cell condition. A wireless communication system comprises a remote radio head that receives network data comprising user data and beamforming instructions from a baseband unit. The remote radio head transfers the user data to wireless communication devices over wireless column beams responsive to the beamforming instructions. The remote radio head further detects a loss of the beamforming instructions for a time threshold and responsively transfers a sleepy-cell alarm indicating the baseband unit.

BRIEF DESCRIPTION OF THE DRAWINGS

The following description and associated figures teach the best mode of the invention. For the purposes of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 6 illustrates an example of a Base Band Unit (BBU) to detect a sleepy-cell condition.

DETAILED DESCRIPTION

The following description and associated figures teach the best mode of the invention. For the purposes of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
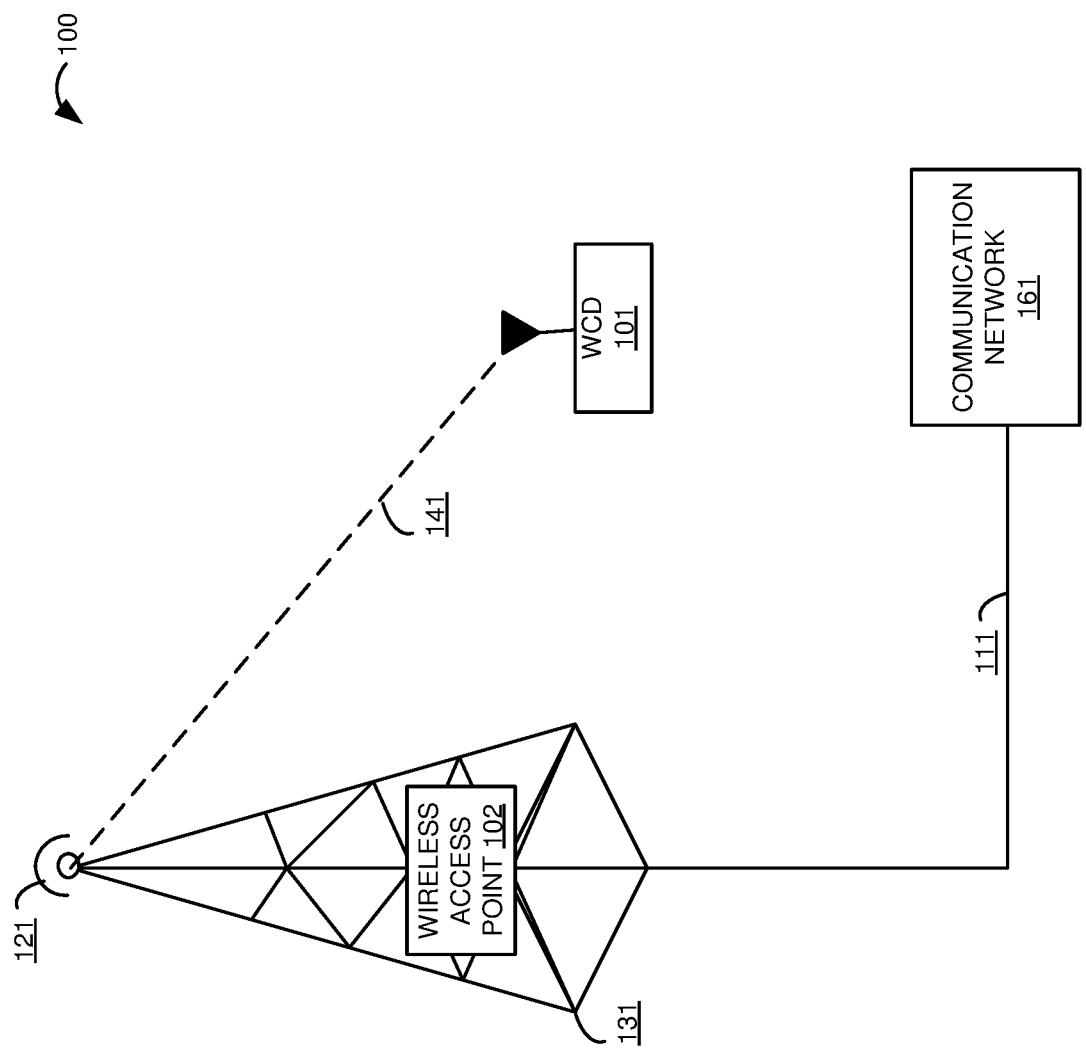
FIG. 1 illustrates a wireless communication system to detect a sleepy-cell condition.

FIG. 1 illustrates wireless communication system 100. Wireless communication system 100 includes wireless communication device (WCD) 101, wireless access point (WAP) 102, and core network 161. Wireless access point 102 includes Remote Radio Head (RRH) 121 and Base Band Unit (BBU) 131. Wireless access point communicates with core network 161 over communication link 111.

In some examples, wireless access point 102 may comprise a Long Term Evolution (LTE) evolved Node B (eNodeB). Examples of wireless communication device 101 include wireless communication devices such as a telephone, cellular phone, User Equipment (UE), mobile phone, smartphone, Personal Digital Assistant (PDA), laptop, computer, e-book, eReader, mobile Internet appliance, or some other wireless communication device with a wireless transceiver—including combinations thereof.

Wireless access point 102 transmits beamformed wireless signal(s) 141. Wireless access point 102 may also transmit omnidirectional communications (not shown for clarity) to all portions of the coverage area of wireless access point 102, such as a sector, to serve all devices including wireless communication device 101. Wireless signal 141 comprises beam-formed communications to a smaller portion of its coverage area to serve only wireless communication device 101.

Communication links 111 and 141 may use any of a variety of communication media, such as air, metal, optical fiber, or any other signal propagation path, including combinations thereof. Also, links 111 and 141 may use any of a variety of communication protocols, such as internet, telephony, optical networking, wireless communication, wireless fidelity, code division multiple access, worldwide interoperability for microwave access, LTE, or any other communication protocols and formats, including combinations thereof. Further, the links could be direct links or they might include various intermediate components, systems, and networks.

In operation, RRH 121 receives network data comprising user data and beamforming instructions from BBU 131. In some examples, user data comprises media streaming data, voice calling data, video calling data, messaging data, or other user data—including combinations thereof. In some examples, the beamforming instructions comprise antenna weights. RRH 121 transfers the user data to wireless communication device 101 over wireless column beams 141 responsive to the beamforming instructions. In some examples, wireless communication device 101 uses a Precoded Matrix Indicator (PMI) to configure its antenna(s) to receive the user data over the wireless column beams.

RRH 121 further detects a loss of the beamforming instructions for a time threshold and responsively transfers a sleepy-cell alarm indicating BBU 131. In some examples, the time threshold is a period of time. Although not required, the sleepy-cell alarm may be transferred to a BBU controller, which responsively reboots the indicated BBU. In some examples, RRH 121 transfers an Antenna Interface Standards Group (AISG) signal. In other examples, RRH 121 transfers a wireless signal.

In some examples, the sleepy-cell alarm indicates at least one of multiple different types of loss of beamforming instructions. For instance, the loss of beamforming instructions may be due to a total loss of connection, incoherent instructions, or a slow-down in the wireless access point. Depending of the type of loss, the wireless access point may require a complete reboot of the system or a reboot of specific modules. For example, different reboot scripts may be selected to run based on the different types of loss. In some examples, RRH 121 may transfer instructions to a BBU controller for BBU 131 to reboot or reset. Although not required, RRH 121 may transfer the sleepy-cell alarm to core network 161.

Figure 2:
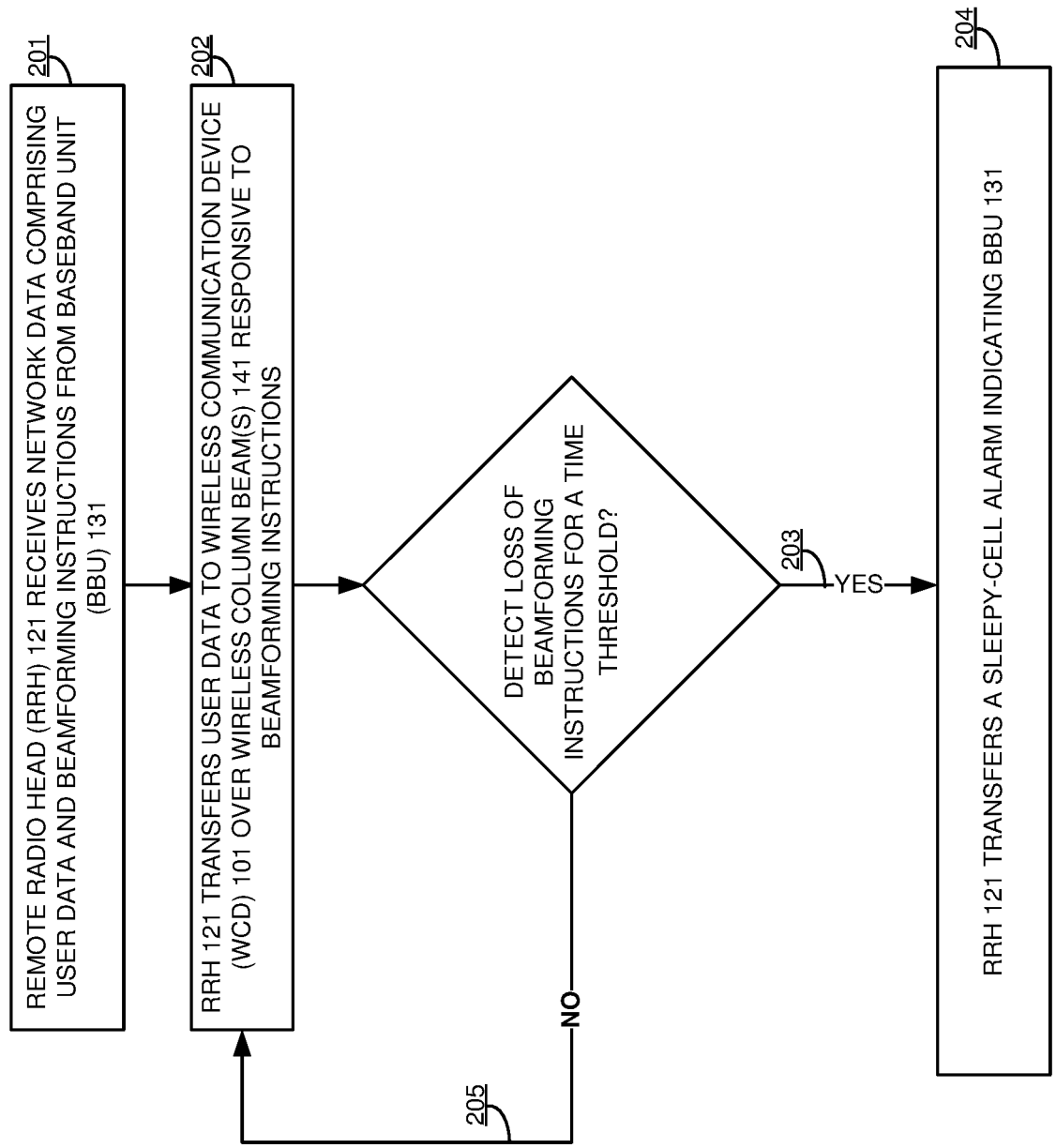
FIG. 2 illustrates the operation of the wireless communication system to detect the sleepy-cell condition.

FIG. 2 illustrates the operation of wireless communication system 100 to detect the sleepy-cell condition. In operation, RRH 121 receives network data comprising user data and beamforming instructions from BBU 131 (201). In some examples, RRH 121 receives Common Public Radio Interface (CPRI) data from BBU 131. RRH 121 transfers the user data to wireless communication device 101 over wireless column beams 141 responsive to the beamforming instructions (202).

If RRH 121 detects a loss of the beamforming instructions for a time threshold (203), then RRH 121 responsively transfers a sleepy-cell alarm indicating BBU 131 (204). For example, RRH 121 may transfer a sleep-cell alarm to a BBU controller. If RRH 121 does not detect a loss of the beamforming instructions for a time threshold (205), then RRH 121 continues to transfer the user data to wireless communication device 101 over wireless column beams 141 responsive to the beamforming instructions (202).

Figure 3:
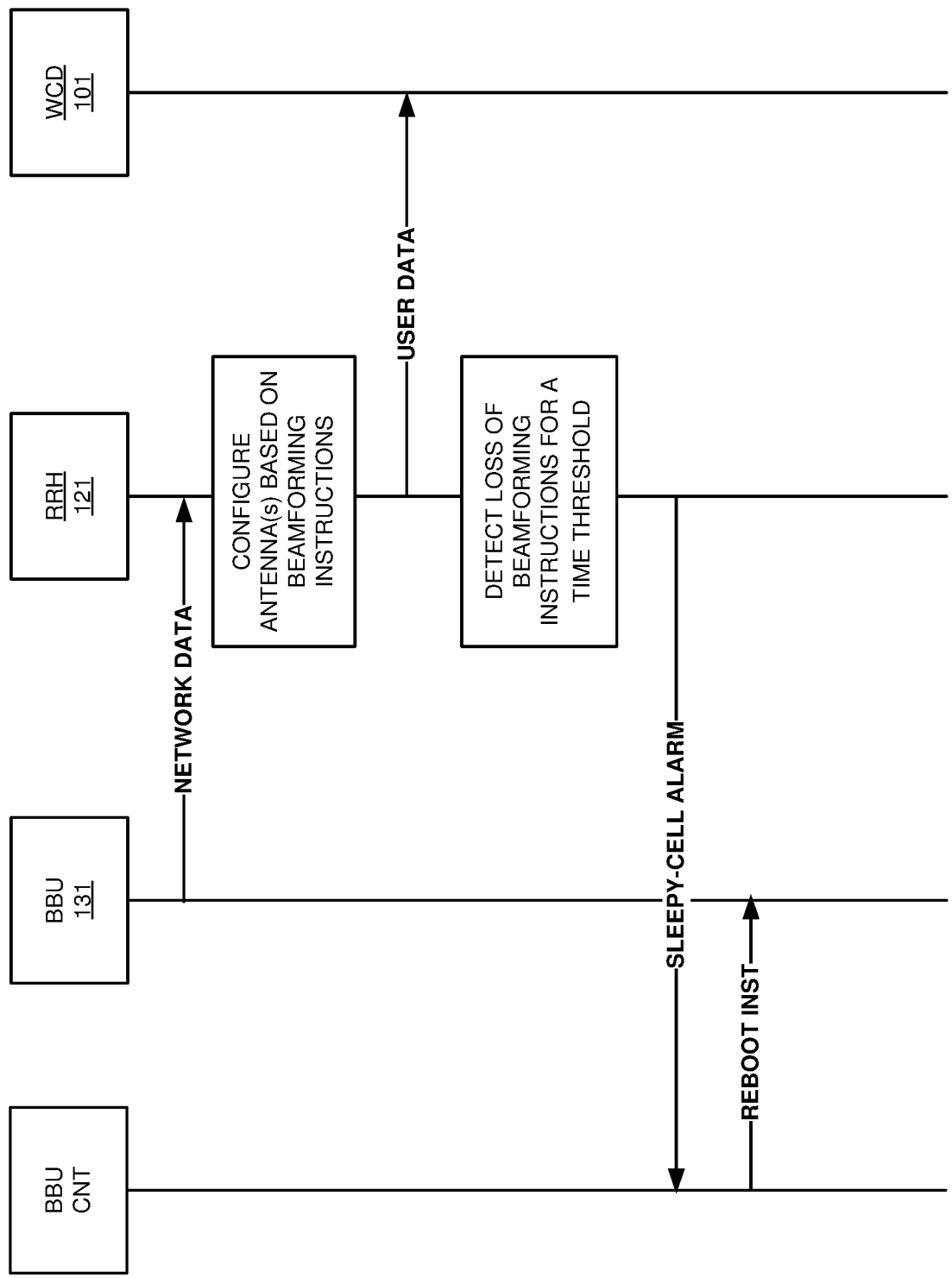
FIG. 3 illustrates the operation of the wireless communication system to detect the sleepy-cell condition.

FIG. 3 illustrates the operation of wireless communication system 100 to detect a sleepy-cell condition. BBU 131 transfers network data comprising user data and beamforming instructions to RRH 121. RRH 121 receives the network data from BBU 131. RRH 121 configures the antenna(s) based on the beamforming instructions. In some examples, RRH 121 configures antenna(s) based on antenna weights in the beamforming instructions. For example, RRH 121 may use a pre-coded matrix to adapt the amplitude and/or phase of each antenna element.

RRH 121 transfers the user data to wireless communication device 101 over wireless column beams responsive to the beamforming instructions. RRH 121 detects a loss of the beamforming instructions for a time threshold and responsively transfers a sleepy-cell alarm indicating BBU 131 to a BBU controller. BBU controller transfers a reboot instruction to BBU 131.

Figure 4:
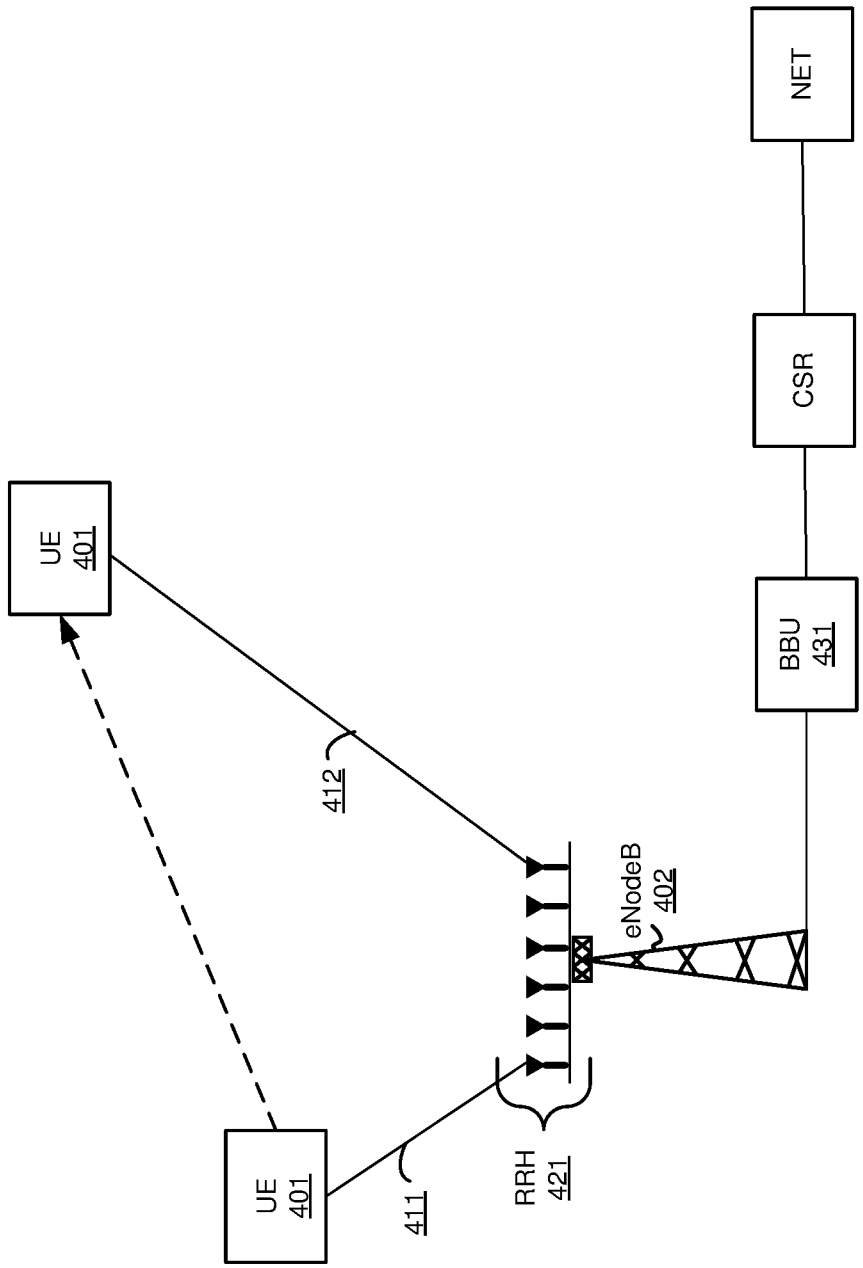
FIG. 4 illustrates a wireless communication system to detect a sleepy-cell condition.

FIG. 4 illustrates wireless communication system 400 to detect a sleepy-cell condition. Wireless communication system 400 includes UE 401, eNode B 402, RRH 421, BBU 431, a cell site router (CSR), and a core network (net). RRH 421 includes multiple antenna elements.

For example, when UE 401 is in position one on the west side of eNode B 402, RRH 421 uses antenna elements closest to UE 401's location to transmit user data using beamformed wireless signal(s) 411. During the communication session, UE 401 moves to a different location, and RRH 421 transmits user data to UE 401 using beamformed wireless signal(s) 412.

In operation, RRH 421 receives network data comprising user data and beamforming instructions from BBU 431. RRH 421 transfers the user data to UE 401 over wireless column beams 411-412 responsive to the beamforming instructions. For example, UE 401 may receive user data, a PMI, and a Rank Indicator (RI) over communication link 411. UE 401 may transfer beamforming data such as, Sounding Reference Signal (SRS), QoS Class Identifier (CQI), and RI data to RRH 421/eNode B 402 over communication link 411.

RRH 421 further detects a loss of the beamforming instructions for a time threshold and responsively transfers a sleepy-cell alarm indicating BBU 431. Although not required, RRH 421 may also report antenna health to BBU 431.

Figure 5:
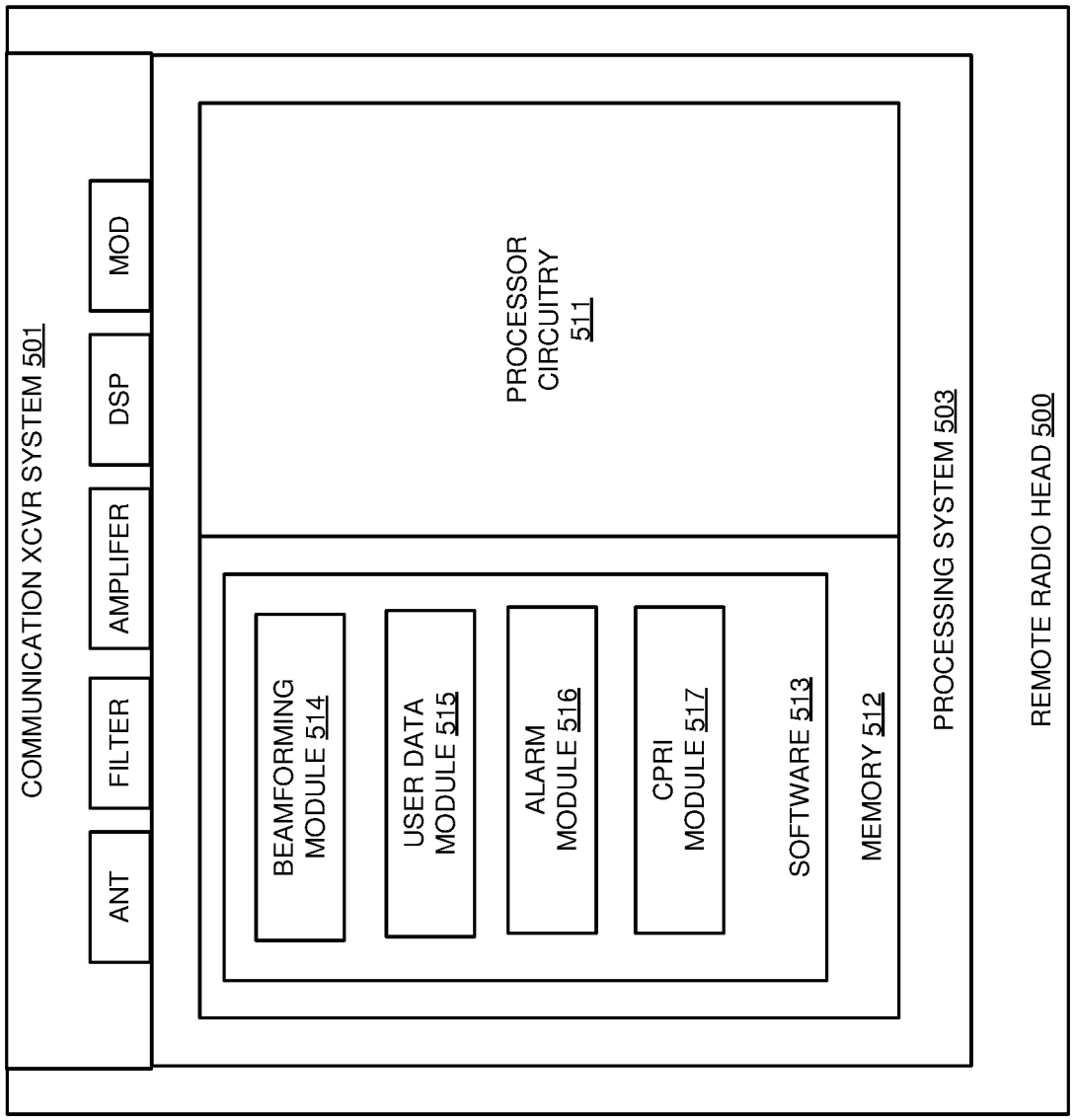
FIG. 5 illustrates an example of a Remote radio head (RRH) to detect a sleepy-cell condition.

FIG. 5 illustrates Remote Radio Head (RRH) 500 to detect a sleepy-cell condition. RRH 500 is an example of RRH 121 and 421, although RRH 121 and 421 may use alternative configurations and operations. RRH 500 comprises communication transceiver system 501 and processing system 503. Processing system 503 includes processing circuitry 511 and memory 512 that stores software 513. Software 513 comprises software modules 514-517.

Communication transceiver system 501 comprises components that communicate over communication links such as network cards, ports, RF transceivers, processor circuitry and software, or some other communication components. Communication transceiver system 501 includes antenna(s), amplifier(s), filter(s), digital signal processors (DSPs), and modulators (mod).

Communication transceiver system 501 may be configured to communicate over metallic, wireless, or optical links. Communication transceiver system 501 may be configured to use TDM, IP, Ethernet, optical networking, wireless protocols, communication signaling, or some other communication format—including combinations thereof. Communication transceiver system 501 may receive and transfer network data. Communication transceiver system 501 may also be configured to communicate using wireless communication protocols such as LTE.

Processor circuitry 511 comprises microprocessor and other circuitry that retrieves and executes operating software 513 from memory 512. Processor circuitry 511 may comprise a single device or could be distributed across multiple devices—including devices in different geographic areas. Processor circuitry 511 may be embedded in various types of equipment. Examples of processor circuitry 511 include central processing units, application-specific processors, logic devices, and/or any type of computer processing devices—including combinations thereof.

Memory 512 comprises a non-transitory computer readable storage medium readable by processing system 503 and capable of storing software 513, such as a disk drive, flash drive, data storage circuitry, or some other hardware memory apparatus—including combinations thereof. Memory 512 can include volatile and/or non-volatile, removable and/or non-removable media implemented in any method or technology for storage of information, such as computer readable instructions, data structures, program modules, or other data—including combinations thereof.

Memory 512 may comprise a single device or could be distributed across multiple devices—including devices in different geographic areas. Memory 512 may be embedded in various types of equipment. In some examples, a computer apparatus could comprise memory 512 and software 513.

Software 513 comprises computer programs, firmware, or some other form of machine-readable processing instructions. Software 513 may include an operating system, utilities, drivers, network interfaces, applications, or some other type of software. In this example, software 513 comprises beamforming module 514, User data module 515, alarm module 516, and Common Public Radio Interface (CPRI) module 517. Although software 513 could have alternative configurations in other examples.

Software 513 may be implemented in program instructions and may be executed by processing system 503. Software 513 may include additional processes, programs, or components, such as operating system software, database software, or application software—including combinations thereof. Software 513 may also comprise firmware or some other form of machine-readable processing instructions executable by processing system 503.

When executed, software 513 directs processing system 503 to operate as described herein to detect a sleepy-cell condition. In particular, beamforming module 514 directs processing system 503 to configure antenna(s) according the received beamforming instructions. User data module 515 directs processing system 503 to wirelessly transfer user data to the wireless communication device(s) over the wireless column beams. Alarm module 516 directs processing system 503 to transfer a sleepy-cell condition alarm indicating the BBU, responsive to detecting a loss of beamforming instructions for a time threshold. CPRI module 517 directs processing system 503 to communicate with the BBU.

FIG. 6 illustrates Baseband Unit (BBU) 600. BBU 600 is an example of BBU 131 and 431. Although these systems may use alternative configurations and operations. BBU 600 comprises communication transceiver system 601 and processing system 603. Processing system 603 includes microprocessor circuitry 611 and memory 612 that stores software 613. Software 613 comprises software modules 614-617.

Communication transceiver system 601 comprises components that communicate over communication links such as network cards, ports, RF transceivers, processing circuitry and software, or some other communication components. Communication transceiver system 601 may be configured to communicate over metallic, wireless, or optical links. Communication transceiver system 601 may be configured to use TDM, IP, Ethernet, optical networking, wireless protocols, communication signaling, or some other communication format—including combinations thereof. Communication transceiver system 601 may receive and transfer registration requests. Communication transceiver system 601 may also be configured to communicate using wireless communication protocols such as LTE.

Processor circuitry 611 comprises microprocessor and other circuitry that retrieves and executes operating software 613 from memory 612. Processor circuitry 611 may comprise a single device or could be distributed across multiple devices—including devices in different geographic areas. Processor circuitry 611 may be embedded in various types of equipment. Examples of processor circuitry 611 include central processing units, application-specific processors, logic devices, and/or any type of computer processing devices—including combinations thereof.

Memory 612 comprises a non-transitory computer readable storage medium readable by processing system 603 and capable of storing software 613, such as a disk drive, flash drive, data storage circuitry, or some other hardware memory apparatus —including combinations thereof. Memory 612 can include volatile and/or non-volatile, removable and/or non-removable media implemented in any method or technology for storage of information, such as computer readable instructions, data structures, program modules, or other data—including combinations thereof. Memory 612 may comprise a single device or could be distributed across multiple devices—including devices in different geographic areas. Memory 612 may be embedded in various types of equipment. In some examples, a computer apparatus could comprise memory 612 and software 613.

Software 613 comprises computer programs, firmware, or some other form of machine-readable processing instructions. Software 613 may include an operating system, utilities, drivers, network interfaces, applications, or some other type of software. In this example, software 613 comprises beamforming module 614, user data module 615, and reboot module 616. Although software 613 could have alternative configurations in other examples.

Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603.

When executed, software 613 directs processing system 603 to operate as described herein to detect a sleepy-cell condition. In particular, beamforming module 614 directs processing system 603 to generate and transfer beamforming instructions. User data module 615 directs processing system 603 to transfer user data to the RRH(s). Reboot module 616 directs processing system 603 to reboot BBU 600. CPRI module 617 directs processing system 603 to communicate with the RRH.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access point 102 comprises RF communication circuitry and an antenna. The RF communication circuitry typically includes an amplifier, filter, RF modulator, and signal processing circuitry. Wireless access point 102 may also comprise antennas, amplifiers, modulators, signal processing circuitry, memory devices, software, bus interfaces, and the like. Wireless access point 102 may further comprise a router, server, memory device, software, processing circuitry, cabling, power supply, network communication interface, structural support, or some other communication apparatus. Wireless access point 102 could be a base station, Internet access node, telephony service node, wireless data access point, Long Term Evolution (LTE) evolved Node B (eNode B), or some other wireless communication system—including combinations thereof.

Communication network 161 comprises network elements that provide communications services to wireless communication device 101 through wireless access point 102. Communication network 161 may comprise switches, wireless access points, wireless access nodes, Internet routers, network gateways, application servers, computer systems, communication links, or some other type of communication equipment—including combinations thereof.

Communication links 111 and 141 use metal, glass, air, space, or some other material as the transport media. Communication links 111 and 141 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111 and 141 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to detect a sleepy-cell condition, the method comprising:
   a baseband unit generating beamforming instructions for wireless column beams to wireless communication devices;
   the baseband unit transferring user data and the beamforming instructions to a remote radio head;
   the remote radio head receiving network data comprising the user data and the beamforming instructions from the baseband unit;
   the remote radio head transferring the user data to the wireless communication devices over the wireless column beams responsive to the beamforming instructions;
   the remote radio head detecting a loss of the beamforming instructions for a time threshold and responsively transferring a sleepy-cell alarm indicating the baseband unit over a wireless signal, wherein the sleepy-cell alarm comprises an Antenna Interface Standards Group (AISG) signal; and
   a baseband unit controller receiving the sleepy-cell alarm and responsively rebooting the baseband unit.

2. The method of claim 1 wherein the remote radio head detecting the loss of the beamforming instructions and responsively transferring the sleepy-cell alarm comprises the remote radio head detecting one of multiple types of loss of the beamforming instructions and transferring the sleepy-cell alarm indicating the one of the multiple types of the loss of the beamforming instructions.

3. The method of claim 2 further comprising a baseband unit controller receiving the sleepy-cell alarm and responsively directing the baseband unit to perform one of multiple types of reboot based on the one of the multiple types of the loss of the beamforming instructions.

4. The method of claim 1 wherein the remote radio head receiving the beamforming instructions from the baseband unit comprises the remote radio head receiving antenna weights from the baseband unit.

5. The method of claim 1 wherein the remote radio head receiving the network data from the baseband unit comprises the remote radio head receiving Common Public Radio Interface (CPRI) data from the baseband unit.

6. The method of claim 1 wherein the remote radio head detecting the loss of the beamforming instructions comprises the remote radio head detecting latency in the beamforming instructions.

7. The method of claim 1 wherein the remote radio head detecting the loss of the beamforming instructions comprises the remote radio head detecting incoherence in the beamforming instructions.

8. A wireless communication system to detect a sleepy-cell condition, the wireless communication system comprising:
   a baseband unit configured to generate beamforming instructions for wireless column beams to wireless communication devices;
   the baseband unit configured to transfer user data and the beamforming instructions to a remote radio head;
   the remote radio head data processor configured to receive network data comprising the user data and the beamforming instructions from the baseband unit;
   the remote radio head antenna system configured to transfer the user data to the wireless communication devices over the wireless column beams responsive to the beamforming instructions;
   the remote radio head data processor configured to detect a loss of the beamforming instructions for a time threshold and responsively transfer a sleepy-cell alarm indicating the baseband unit over a wireless signal, wherein the sleepy-cell alarm comprises an Antenna Interface Standards Group (AISG) signal; and
   a baseband unit controller configured to receive the sleepy-cell alarm and responsively reboot the baseband unit.

9. The wireless communication system of claim 8 wherein the remote radio head is configured to detect one of multiple types of loss of the beamforming instructions and transfer the sleepy-cell alarm indicating the one of the multiple types of the loss of the beamforming instructions.

10. The wireless communication system of claim 9 wherein the baseband unit is further configured to direct the baseband unit to perform one of multiple types of reboot based on the one of the multiple types of the loss of the beamforming instructions.

11. The wireless communication system of claim 8 wherein the remote radio head is configured to receive antenna weights from the baseband unit.

12. The wireless communication system of claim 8 wherein the remote radio head is configured to receive Common Public Radio Interface (CPRI) data from the baseband unit.

13. The wireless communication system of claim 8 wherein the remote radio head is configured to detect latency in the beamforming instructions.

14. The method of claim 1 wherein the remote radio head is configured to detect incoherence in the beamforming instructions.

* * * * *